United States Patent Office 3,639,637
Patented Feb. 1, 1972

3,639,637
WATER DISPERSIBLE DIETHYLSTILBESTROL COMPOSITIONS
James A. Campbell, Ashland, Ohio, assignor to Richardson-Merrell Inc., New York, N.Y.
No Drawing. Filed Apr. 23, 1968, Ser. No. 723,599
Int. Cl. A61k 27/00, 17/06
U.S. Cl. 424—346                                3 Claims

ABSTRACT OF THE DISCLOSURE

Water-dispersible diethylstilbestrol compositions comprising finely-divided diethylstilbestrol and 70 to 95 percent of a water-dispersible, gel-forming microcrystalline cellulose hydrocolloid and preferably also containing small amounts of a dispersing agent such as sodium carboxymethylcellulose and other similar hydrocolloids. The dry mixture is simply mixed with water for from 5 to 30 minutes to obtain a stable aqueous suspension of the diethylstilbestrol.

---

This invention relates to a new composition of matter useful in dispersing diethylstilbestrol in animal feeds.

Diethylstilbestrol is widely used in animal husbandry, particularly in fattening cattle. A preferred way of administering this estrogen is to incorporate it in the animal feed. The amounts of diethylstilbestrol that is given cattle for improving their carcass quality is about 10 milligrams per head per day. This may be administered as a feed supplement, but sometimes it is mixed into the entire finished feed. When administered in the total ration, the concentration of diethylstilbestrol is only about 0.0009 percent by weight. When administered in a feed supplement, the amount may vary from about 0.0044 percent to 0.0088 percent by weight.

Inasmuch as diethylstilbestrol is a highly potent synthetic estrogen, it is important that it be uniformly mixed with the feed so that the animal will ingest an adequate but not excessive amount of the estrogen. The diethylstilbestrol is usually added to the feed by spraying a solution of the estrogen onto the feed and thoroughly mixing it therewith. Previously, two kinds of diethylstilbestrol solutions were available for this purpose—one a solution in soybean oil and the other a solution in polyethylene glycol/200. These solutions are usually distributed in concentrated form and diluted before mixing with the feed. In the case of the oil solutions, another oil or fat must be used to dilute the concentrate. Similarly, in the case of the polyethylene glycol concentrates, water or additional polyethylene glycol may be used in diluting the solution before spraying. In both cases, there are a number of disadvantages. The solvents are expensive and represent an added cost. At extremely low temperatures, the solutions may freeze or the estrogen may be precipitated. The additional weight of the solvent which must be shipped increases the final cost still further. It appears, therefore, that a cheaper, more simple, and more convenient form of water-dispersible diethylstilbestrol which can be easily prepared by the user just prior to use and sprayed onto the animal feed is desirable.

Diethylstilbestrol is virtually insoluble in water and does not lend itself to dispersion by the usual dispersing and suspending agents. Many different dispersing agents and combinations thereof have been tried in an effort to achieve a dry dispersible product. The usual problems which were encountered were the inability to wet the diethylstilbestrol and the inability of these dispersing agents to hold the estrogen in dispersion after it had been wetted and mixed with water at a dilution sufficiently low to insure uniform mixing of the diethylstilbestrol in the animal feed.

The present invention is based upon the discovery that a finely-divided diethylstilbestrol, when intimately mixed with microcrystalline cellulose and preferably with a dispersing agent such as sodium carboxymethylcellulose, forms a mixture that can be readily dispersed in water to form a relatively stable suspension of diethylstilbestrol which can be sprayed on or otherwise mixed with animal feeds uniformly throughout.

The novel compositions of the present invention are prepared by intimately mixing finely-divided diethylstilbestrol wtih microcrystalline cellulose to the extent of 70 to 95 percent by weight of the total composition. A small amount of a dispersing agent such as sodium carboxymethylcellulose is also usually included to aid in wetting and dispersing. Microcrystalline cellulose is an article of commerce being sold, for instance, under the trade name Avicel RC–581 by American Viscose Division of FMC Corporation. The microcrystalline cellulose is a water-dispersible organic hydrocolloid which when slurried in water under high shear mixing at 1 to 5 percent concentration produces thioxotropic elastic gels. Small amounts of sodium carboxymethylcellulose are usually included in the commercial product to aid in dispersing the microcrystalline cellulose. Further details of the processes of manufacturing and the physical properties of this microcrystalline cellulose product are described in U.S. Pat. 2,978,446 issued Apr. 4, 1961.

To prepare the new product of the present invention, finely-divided diethylstilbestrol having a particle size such that about 80 percent of it will pass through a 40 mesh screen is mixed with commercial microcrystalline cellulose, passed through a 20 mesh screen, and then mixed again. The dry powder is ready to be packaged and shipped to the ultimate user. To incorporate diethylstilbestrol in animal feeds with this product, the desired amount of the dry powder is mixed with ordinary tap water at room temperature with any convenient stirring device. High shear mixers as are used to obtain optimum gels are not necessary. The concentration of the diethylstilbestrol-microcrystalline cellulose product which is incorporated in the water may be as high as 15 percent by weight. Usually a period of mixing the dry composition in water of from 5 minutes to 30 minutes is desirable to improve stability of the diethylstilbestrol suspension.

As an indication of the effectiveness of the composition of the present invention in preparing stable suspensions, it was found that when an aqueous dispersion of diethylstilbestrol was prepared as described herein, there was a fallout of the estrogen of only about 13 percent in 8 hours from samples taken 1 inch below the surface of the aqueous dispersion.

Although the compositions just described are generally adequate under normal conditions, it is found that in some places where the water is hard and contains salts and other ionizing materials, the product is improved by incorporating additional amounts of sodium carboxymethylcellulose, methylcellulose, hydroxyethylcellulose, or other similar water-dispersible hydrocolloid. Amounts of these hydrocolloids up to about one third of the total weight of the composition often improve the stability of the aqueous suspension and make it possible to use the product under more diversified field conditions.

A preferred product of the present invention would be one containing 120 grams of finely-divided diethylstilbestrol per pound of composition. In addition to the diethylstilbestrol the preferred product would contain about 250 grams of the commercial form of the microcrystalline cellulose, which contains a small percentage of sodium carboxymethylcellulose, and 80 grams of hydroxyethylcellulose. Normally, the product will contain a small amount of water, usually on the order of about 5 percent by weight. One pound of this powder may be mixed with one gallon of water to form a stable suspension of diethylstilbestrol. This aqueous suspension may be further diluted with water to any desired concentration before mixing with the animal feed or with a pre-mix suitable for shipping and to be further blended with the diet of the animals. The amount of diethylstilbestrol to be administered should not, of course, exceed the upper limit of 10 milligrams of the estrogen per animal per day.

Because finely-divided diethylstilbestrol tends to dust when handled in a dry state and as it is a potent estrogen, care should be taken to avoid inhaling the dust while preparing the solutions. This problem may be overcome by several methods which include forming the product into tablets which are readily dispersible in water, placing the powder in a water-soluble envelope, or mixing a limited amount of the powder in a large volume container into which water is added and the suspension prepared by shaking the container.

What is claimed is:

1. A composition for the preparation of stable suspensions of diethylstilbestrol in water which comprises a mixture of 70 to 95 percent by weight of water-dispersible, gel-forming microcrystalline cellulose hydrocolloid and 5 to 30 percent by weight of finely-divided diethylstilbestrol having a particle size such that about 80 percent will pass through a 40-mesh screen.

2. A composition in accordance with claim 1 which also contains up to one third of the weight of the composition of a hydrocolloid of the group consisting of sodium carboxymethylcellulose, methylcellulose, and hydroxyethylcellulose.

3. A composition for the preparation of stable suspensions of diethylstilbestrol in water which comprises a mixture of 120 grams of finely-divided diethylstilbestrol having a particle size such that about 80 percent of it will pass through a 40-mesh screen, 250 grams of commercial microcrystalline cellulose, 80 grams of hydroxyethylcellulose, and about 5 percent by weight of water.

References Cited

UNITED STATES PATENTS

| | | | |
|---|---|---|---|
| 2,824,546 | 2/1958 | Klette | 99—2 |
| 2,895,875 | 7/1959 | Klette | 424—346 |
| 3,144,337 | 8/1964 | McKeen et al. | 99—2 |
| 3,146,168 | 8/1964 | Battista | 424—362 |
| 3,146,170 | 8/1964 | Battista | 424—362 |
| 3,290,218 | 12/1966 | De Jong | 424—362 |
| 3,332,848 | 7/1967 | Magid | 424—362 |
| 2,978,446 | 4/1961 | Battista | 260—212 |

FOREIGN PATENTS

| | | | |
|---|---|---|---|
| 600,707 | 6/1960 | Canada | 99—2 |

ALBERT T. MYERS, Primary Examiner

F. E. WADDELL, Assistant Examiner

U.S. Cl. X.R.

424—362

UNITED STATES PATENT OFFICE
CERTIFICATE OF CORRECTION

Patent No. 3,639,637　　　　　　　　　Dated February 1, 1972

Inventor(s) James A. Campbell

It is certified that error appears in the above-identified patent and that said Letters Patent are hereby corrected as shown below:

The first two lines below the title in Column 1 should read:

-- James A. Campbell, Ashland, Ohio; assignor by mesne assignment to Rhodia, Inc., New York, N.Y. --

Signed and sealed this 8th day of August 1972.

(SEAL)
Attest:

EDWARD M. FLETCHER, JR.　　　　ROBERT GOTTSCHALK
Attesting Officer　　　　　　　　Commissioner of Patents